(12) United States Patent
Heap et al.

(10) Patent No.: US 9,193,347 B2
(45) Date of Patent: Nov. 24, 2015

(54) METHOD AND APPARATUS FOR CONTROLLING A MULTI-MODE POWERTRAIN SYSTEM TO AVOID AN OPERATING REGION

(71) Applicant: GM GLOBAL TECHNOLOGY OPERATIONS LLC, Detroit, MI (US)

(72) Inventors: Anthony H. Heap, Ann Arbor, MI (US); Sean W. McGrogan, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 13/967,412

(22) Filed: Aug. 15, 2013

(65) Prior Publication Data
US 2015/0051048 A1    Feb. 19, 2015

(51) Int. Cl.
*B60W 10/06*    (2006.01)
*B60W 10/11*    (2012.01)
*B60W 20/00*    (2006.01)

(52) U.S. Cl.
CPC ............... *B60W 10/11* (2013.01); *B60W 10/06* (2013.01); *B60W 20/1084* (2013.01); *B60W 20/40* (2013.01)

(58) Field of Classification Search
CPC .................... B60W 20/1084; B60W 20/40
USPC ...................... 477/3; 903/930; 701/54
See application file for complete search history.

(56) References Cited

U.S. PATENT DOCUMENTS

2008/0122391 A1*    5/2008    Iwase et al. ............... 318/460

\* cited by examiner

*Primary Examiner* — Edwin A Young
*Assistant Examiner* — Colby M Hansen

(57) ABSTRACT

A powertrain system includes an engine coupled to a multi-mode transmission configured to transfer tractive torque to an output member coupled to a ground wheel. A method for operating the powertrain system includes identifying an undesirable operating region for the multi-mode transmission associated with driveline growl including an input torque range and an output torque range. In response to a command to traverse the undesirable operating region from a first operating region to a second operating region, a fast engine torque transition is executed including controlling the engine as a fast-adjusting torque actuator to control input torque from the engine to the multi-mode transmission and correspondingly controlling motor torque from a torque machine to the multi-mode transmission to maintain output torque from the multi-mode transmission responsive to an output torque request while traversing the undesirable operating region from the first operating region to the second operating region.

15 Claims, 4 Drawing Sheets

METHOD AND APPARATUS FOR CONTROLLING A MULTI-MODE POWERTRAIN SYSTEM TO AVOID AN OPERATING REGION

TECHNICAL FIELD

This disclosure is related to dynamic system controls for multi-mode powertrain systems employing multiple torque-generative devices.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes an engine coupled to a multi-mode transmission configured to transfer tractive torque to an output member coupled to a ground wheel. A method for operating the powertrain system includes identifying an undesirable operating region for the multi-mode transmission associated with driveline growl including an input torque range and an output torque range. In response to a command to traverse the undesirable operating region from a first operating region to a second operating region, a fast engine torque transition is executed including controlling the engine as a fast-adjusting torque actuator to control input torque from the engine to the multi-mode transmission and correspondingly controlling motor torque from a torque machine to the multi-mode transmission to maintain output torque from the multi-mode transmission responsive to an output torque request while traversing the undesirable operating region from the first operating region to the second operating region.

BRIEF DESCRIPTION OF THE DRAWINGS

One or more embodiments will now be described, by way of example, with reference to the accompanying drawings, in which.

DETAILED DESCRIPTION

Figure 1:
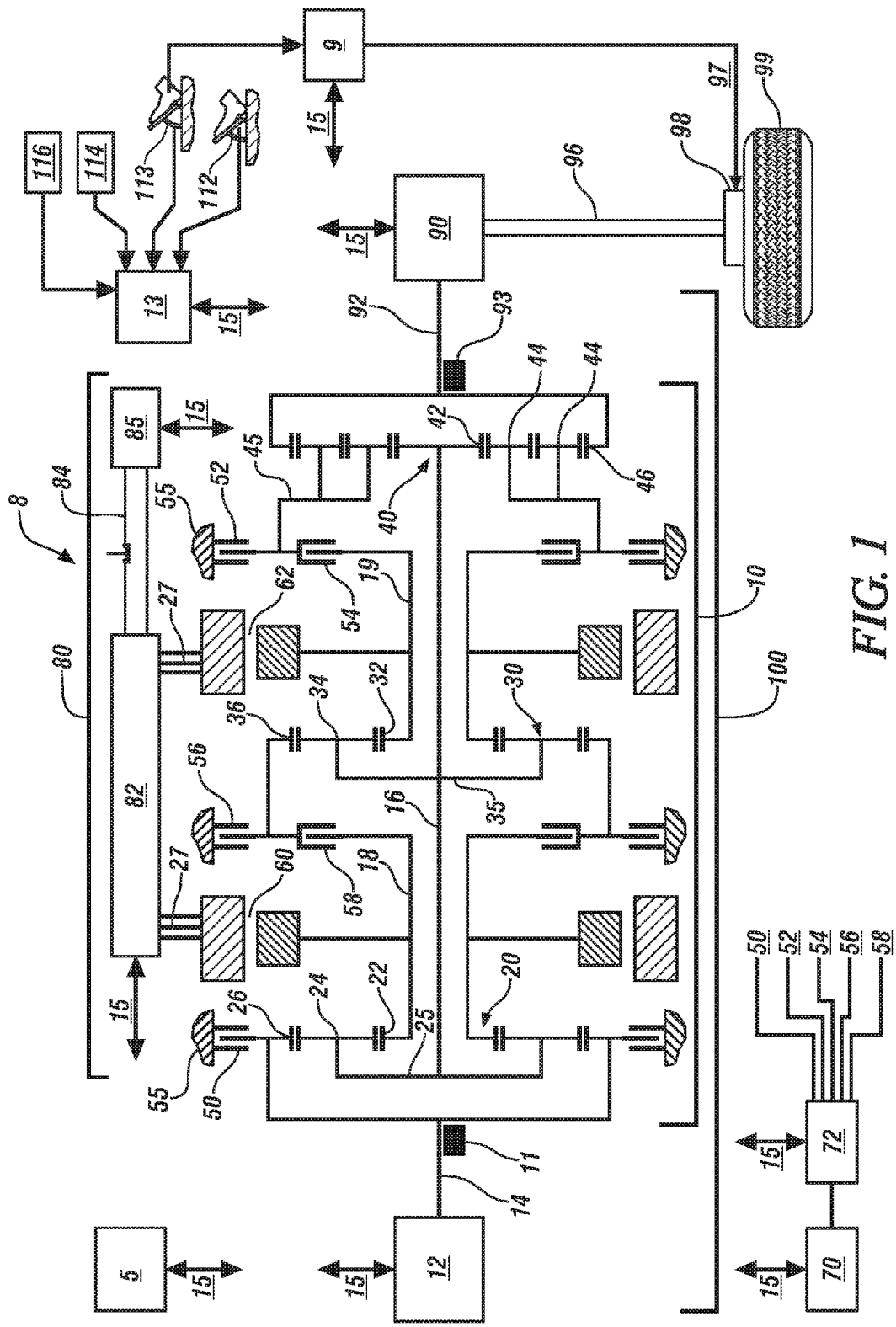
FIG. 1 illustrates a vehicle including a multi-mode powertrain system configured to transfer tractive torque to one or more ground wheels for propulsion, in accordance with the disclosure.

Referring now to the drawings, wherein the showings are for the purpose of illustrating certain exemplary embodiments only and not for the purpose of limiting the same, FIG. 1 depicts a non-limiting embodiment of a vehicle 8 including a multi-mode powertrain system 100 configured to transfer tractive torque to one or more ground wheels 99 for propulsion. The multi-mode powertrain system 100 includes an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. The first and second torque machines 60, 62 are electric motor/generators. The driveline 90 includes a differential system that couples via an axle 96 to one of the ground wheels 99. In one embodiment, the driveline 90 is configured in a rear-wheel drive arrangement. Alternatively, the driveline 90 can be configured to operate in a front-wheel drive arrangement, an all-wheel drive arrangement, a four-wheel drive arrangement, or another arrangement without limitation.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The exemplary transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the TPIM 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 rotatably connects to the driveline 90 to provide output power to the driveline 90 that is transferred to one or a plurality of the ground wheels 99 via differential gearing or another suitable device in this embodiment. The output power at the output member 92 is characterized in terms of an output rotational speed and an output torque. A transmission output speed sensor 93 monitors rotational speed and rotational direction of the output member 92. Each of the ground wheels 99 is preferably equipped with a sensor configured to monitor wheel speed to determine vehicle speed, and absolute and relative wheel speeds for braking control, traction control, and vehicle acceleration management. Each ground wheel 99 is preferably equipped with a controllable wheel brake 98 that can be any suitable configuration, e.g., a disc-brake configuration. Each wheel brake 98 applies a mechanical brake torque 97 for resisting rotation of the corresponding ground wheel 99, wherein a brake controller 9 commands the mechanical brake torque 97 in response to an operator-commanded braking force 113. The mechanical brake torque 97 can directly correspond to the operator-commanded braking force 113. Alternatively, the mechanical brake torque 97 can be responsive to the operator-commanded braking force 113 taking into account an electrical brake torque induced in the driveline 90 through the output member 92 due to electrically-induced reactive torque from one or both of the first and second torque machines 60, 62. The electrically-induced reactive torque from one or both of the first and second torque machines 60, 62 may be associated with regenerative braking.

The input torque from the engine 12 and the motor torques from the first and second torque machines 60, 62 are generated as a result of energy conversion from fuel or electrical potential stored in the battery 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) for converting DC power from the battery 85 to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. The controller 5 signally connects to the brake controller 9 via communications link 15 for coordinating operational control of vehicle braking as described herein. A user interface 13 is preferably signally connected to a plurality of devices through which a vehicle operator directs and commands operation of the powertrain system, including commanding an output torque request and selecting a transmission range. A vehicle operator directs and commands operation of the powertrain system, including an operator-commanded acceleration 112 input from an accelerator pedal, the operator-commanded braking force 113 input from a brake pedal, an operator-commanded transmission range 114 input from a range selector (PRNDL), and an operator-commanded vehicle speed 116 input from a cruise control system. The operator-commanded acceleration 112 input from the accelerator pedal can range from a 0% level indicating no operator input to the accelerator pedal to a 100% level indicating a maximum operator input to the accelerator pedal, often referred to as a wide-open throttle (WOT) maneuver. The operator-commanded braking force 113 can range from a 0% level indicating no operator input to the brake pedal to a 100% level indicating a maximum operator input to the brake pedal. The transmission range selector may provide for a discrete number of operator-selectable transmission ranges, including an operator-intended direction of travel of the vehicle for indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of a transmission range selector can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, 25 and 100 milliseconds during ongoing engine and vehicle operation. Alternatively, routines may be executed in response to occurrence of an event.

The multi-mode powertrain 100 is configured to operate in one of a plurality of powertrain states, including a plurality of transmission ranges and engine states to generate and transfer torque to the driveline 90. The engine states include an ON state and an OFF state. The engine is considered to be in the ON state when the engine is spinning. The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing, and not generating torque. The engine ON state further includes a fuel cutoff (FCO) state, wherein all of the cylinders are unfueled, not firing, and not generating torque. When the engine is in the OFF state, it is not spinning. In one embodiment, operating with the engine in the OFF state can be accomplished by grounding rotation of the input member to the transmission case using a clutch or similar device. By way of example, the powertrain system 100 shown with reference to FIG. 1 can operate with the engine 12 in the OFF state, i.e., not spinning by activating clutch C5 50 to ground rotation of the input member 14 to the transmission case 55 with speeds of the first and second torque machines 60, 62 controlled to achieve an output speed and output torque that is responsive to the output torque request. Alternatively or in addition, operating with the engine in the OFF state can be accomplished by controlling rotational speeds of the torque machines to achieve an input speed that is zero and an output speed and output torque that are responsive to the output torque request. The output torque request includes a positive output torque request leading to vehicle acceleration and/or steady-state cruising operation.

When the engine operates in the FCO state, the engine is spinning but is unfueled and not firing. The engine can operate in the FCO state in response to an operator command for vehicle deceleration, such as occurs when an operator lifts their foot from the accelerator pedal, referred to herein as a decel-fuel cutoff state (dFCO). The engine can be commanded to operate in the FCO state under other non-deceleration operating conditions described herein.

The transmission ranges include a plurality of neutral (neutral), fixed gear (Gear #), variable mode (EVT Mode #), electric vehicle (EV #) and transitional (EV Transitional Range# and Pseudo-gear #) ranges that are achieved by selectively activating the clutches C1 50, C2 52, C3 54, C4 56, and C5 58. The pseudo-gear ranges are variable mode transmission ranges in which magnitude of torque output from the transmission to the driveline correlates to magnitude of the engine input torque, taking into account torque losses associated with torque-consuming components on the input member 14. The pseudo-gear range(s) can be employed as intermediate transmission ranges during shifts between EVT Mode ranges, and can also be employed as steady-state transmission operating states. Table 1 depicts a plurality of transmission ranges and engine states for operating the multi-mode powertrain 100, wherein "x" indicates an activated clutch for the transmission range.

TABLE 1

| Range | Engine State | C1 | C2 | C3 | C4 | C5 |
|---|---|---|---|---|---|---|
| Neutral 1 | ON | | | | | |
| Neutral 2 | ON(ALL/DEAC/dFCO) | | x | | | |
| Neutral 3 | ON(ALL/DEAC/dFCO) | | | x | | |
| Pseudo-gear 1 | ON(ALL/DEAC/dFCO) | x | | | | |
| Pseudo-gear 2 | ON(ALL/DEAC/dFCO) | | x | | | |
| Neutral | OFF | | | | | x |
| EVT Mode 1 | ON(ALL/DEAC/dFCO) | x | | x | | |
| EVT Mode 2 | ON(ALL/DEAC/dFCO) | x | | | x | |
| EVT Mode 3 | ON(ALL/DEAC/dFCO) | | | x | x | |
| EVT Mode 4 | ON(ALL/DEAC/dFCO) | | | | x | x |
| EV Transitional State 1 | OFF | x | | | | x |
| EV Transitional State 2 | OFF | | x | | | x |
| Gear 1 | ON(ALL/DEAC/dFCO) | x | | x | x | |
| Gear 2 | ON(ALL/DEAC/dFCO) | x | x | | x | |
| Gear 3 | ON(ALL/DEAC/dFCO) | | | x | x | x |
| EV1 | OFF | x | | x | | x |
| EV2 | OFF | x | | | x | x |
| EV3 | OFF | | | x | x | x |
| EV4 | OFF | | | x | x | x |
| EV Transitional State 3 | OFF | x | x | | | x |
| Neutral | OFF | | | x | x | |
| Pseudo-gear 3 | ON(ALL/DEAC/dFCO) | x | x | | | |
| Neutral | OFF | | | x | | x |
| Neutral | OFF | | | | x | x |

The powertrain states for operating the multi-mode powertrain 100 further include a plurality of pseudo-EV powertrain ranges wherein the first and second torque machines 60, 62 are controlled to generate and transfer torque to the driveline 90 in response to the output torque request and the engine 12 is operating in the fuel cutoff (FCO) state, i.e., with the engine spinning and unfueled. A multi-mode transmission composed of high inertia components and planetary gear sets can be susceptible to objectionable driveline noise and vibration, referred to herein as growl, in certain regions of operation. The regions of operation can be defined in terms of rotational speeds, including a transmission input speed and a transmission output speed. A multi-mode transmission can operate in an objectionable driveline growl region including under conditions when the engine is in the ON state, including, e.g., vehicle launch and vehicle creep conditions.

Figure 2:
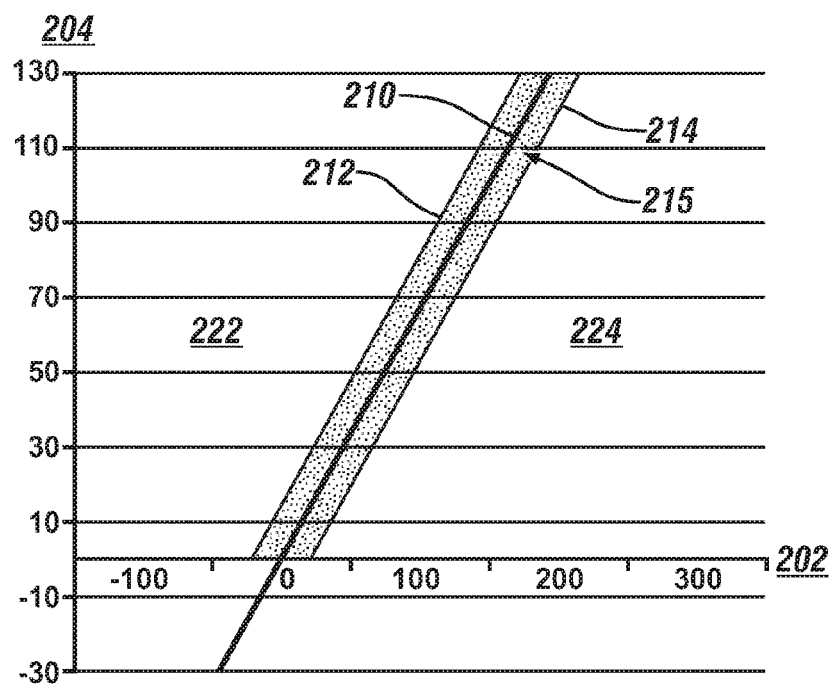
FIG. 2 illustrates data from a multi-mode powertrain showing an operating domain including input torque and output torque, depicting a transmission input/output torque region associated with objectionable driveline growl, in accordance with the disclosure.

FIG. 2 illustrates data from an embodiment of a multi-mode powertrain described with reference to FIG. 1, showing an operating domain including input torque and output torque, depicting a transmission input/output torque region associated with driveline growl, i.e., a region wherein objectionable driveline growl may occur. Horizontal axis 202 illustrates output torque from an embodiment of the multi-mode transmission 10 and vertical axis 204 illustrates input torque originating from an embodiment of the engine 12 coupled to the multi-mode transmission 10. Line 210 illustrates data including a motor torque for a torque machine, e.g., the second torque machine 62, equals zero over a range of engine torques and output torques. Line 212 represents operating points whereat the motor torque is −15 Nm from Line 210 over the range of engine torques and output torques, and region 222 depicts a negative half-plane operating region wherein motor torques are at most −15 Nm from Line 210 over the range of engine torques and output torques. Line 214 represents operating points whereat the motor torque is +15 Nm from Line 210 over the range of engine torques and output torques and region 224 depicts a positive half-plane operating region whereat motor torques are at least +15 Nm from Line 210 over the range of engine torques and output torques. Region 215 is defined within lines 212 and 214 and represents a transmission input torque/output torque region whereat the embodiment of the multi-mode transmission is susceptible to objectionable driveline growl, referred to as a "no-fly" region or zone or an objectionable driveline growl region or zone. As shown, lines 212 and 214 circumscribe the no-fly region 215 that is within +/−15 Nm of a zero motor torque line over a range of engine torques and output torques for the illustrated multi-mode transmission, and illustrate the objectionable driveline growl region that is defined with reference to measurable operating metrics of the powertrain system. Thus, the positive half-plane operating region 224 is disjointed from the negative half-plane operating region 222, being separated by the no-fly region 215.

The objectionable driveline growl region may be specific to a particular powertrain configuration. The objectionable driveline growl region illustrates a region of powertrain operation in which operating time is preferably minimized to prevent detection by a vehicle operator. Objectionable driveline growl may be generated at various locations within a powertrain, and each of the powertrain locations may exhibit different operating regions conducive to growl. An operating region associated with objectionable driveline growl for a powertrain configuration can be developed in an off-line environment by experimentation, simulation, modeling and/or other suitable analytical techniques.

The method disclosed herein can be used to minimize powertrain operation in the objectionable driveline growl region to eliminate or minimize objectionable driveline growl. In one example, cost or power penalties in a control routine can be assigned when the powertrain is operating in the objectionable driveline growl region, such that the powertrain system seeks to minimize operation in that region and rapidly transition away from it. The method disclosed includes a process that facilitates a transition from one powertrain operating region to another powertrain operating region while minimizing operating time in an objectionable driveline growl region to prevent operator detection of objectionable driveline growl. This can include controlling engine air or spark torque and engine speed to quickly control the engine to facilitate a rapid transition across the objectionable driveline growl region.

Figure 3:
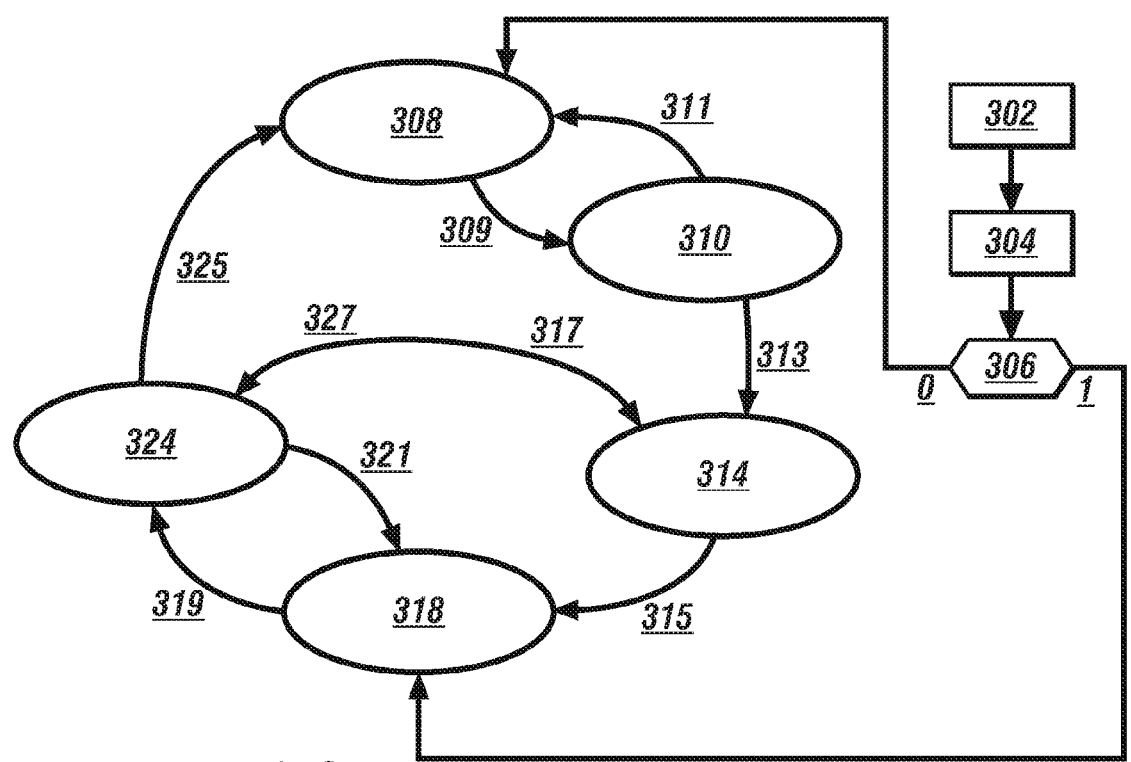
FIG. 3 illustrates a growl avoidance process that can be executed to control operation of a vehicle including a multi-mode powertrain system, in accordance with the disclosure.

FIG. 3 schematically shows a growl avoidance process 300 that can be executed to control operation of a vehicle including a multi-mode powertrain system that transfers torque to a ground wheel in response to an output torque request. One embodiment of a vehicle including a multi-mode powertrain system is described with reference to FIG. 1 with the engine in an ON state. As described and depicted herein, the engine is controlled as a fast actuator to rapidly transition across the objectionable driveline growl region.

The growl avoidance process 300 is executed in one or more of the controllers, and includes identifying an undesirable operating region for a multi-mode transmission, i.e., an objectionable driveline growl region that is defined with reference to an input torque range and an output torque range. In response to a command to traverse the undesirable operating region from a first half-plane operating region to a second half-plane operating region, a fast engine torque transition is executed, including controlling the internal combustion engine as a fast-adjusting torque actuator to control input torque to the multi-mode transmission and correspondingly controlling torque from one of the torque machines to the multi-mode transmission to maintain output torque from the multi-mode transmission responsive to an output torque request while traversing the undesirable operating region from the first half-plane operating region to the second half-plane operating region.

Table 2 is provided as a key to FIG. 3 wherein the numerically labeled blocks and the corresponding functions are set forth as follows.

TABLE 2

| BLOCK | BLOCK CONTENTS |
|---|---|
| 302 | Identify input/output torque region associated with driveline growl |
| 304 | Monitor vehicle and powertrain operation<br>PRNDL in one of R, D, L<br>To-acc<br>To-brake<br>Vss<br>Engine ON<br>Determine Tb |
| 306 | Determine:<br>Tb in positive half-plane operating region or<br>Tb in negative half-plane operating region? |

TABLE 2-continued

| BLOCK | BLOCK CONTENTS |
|---|---|
| 308 | Operate powertrain system in positive half-plane operating region |
| 309 | Does Te-min/Te-max in the negative half-plane operating region overlap with Te capacity range? |
| 310 | Pre-load engine torque<br>Build engine torque reserve<br>Determine Target Te in negative half-plane operating region<br>Determine Te limits in positive half-plane operating region<br>Determine engine response type<br>Calculate Tb Opt at Te-air, Ni-dot desired, and To-range |
| 311 | Ready Conditions not met<br>Tb NOT ≤ Tb in negative plane |
| 313 | Ready Conditions met:<br>Tb ≤ Tb in negative plane |
| 314 | Execute Fast Engine Torque Transition<br>Increase engine torque by spark management and execute transition across No Fly Zone to negative half-plane operating region<br>Calculate Tb at Te-imm, Ni-dot desired, and To-range<br>Calculate engine torque constraints to calibrated ramp rate<br>Constrain Tb during transition |
| 315 | Abort transition across No Fly Zone to negative half-plane operating region when Tb-opt TaTb ≤ Tb in negative half-plane operating region |
| 317 | Abort executing transition across No Fly Zone to negative half-plane operating region when Tb-opt TaTb NOT ≤ Tb in negative half-plane operating region |
| 318 | Operate powertrain system in negative half-plane operating region |
| 319 | Does Te-min/Te-max in the positive half-plane operating region overlap with Te capacity range? |
| 321 | Tb NOT ≥ Tb in positive plane |
| 324 | Execute Fast Engine Torque Transition<br>Decrease engine torque by spark management and execute transition across No Fly Zone to positive half-plane operating region<br>Calculate Tb at Te-imm, Ni-dot desired, and To-range<br>Calculate engine torque constraints to calibrated ramp rate<br>Constrain Tb during transition |
| 325 | Transition across No Fly Zone to positive half-plane operating region when Tb-opt TaTb ≥ Tb in positive half-plane operating region |
| 327 | Abort executing transition across No Fly Zone to positive half-plane operating region when Tb-opt TaTb NOT ≥ Tb in positive half-plane operating region |

An input/output torque region associated with an objectionable driveline growl region for the embodiment of the subject hybrid powertrain system is identified (302). Vehicle and powertrain operation is monitored, including such elements as the operator-commanded acceleration input from an accelerator pedal, the operator-commanded braking force input from a brake pedal, an operator-commanded transmission range input from a range selector (PRNDL), vehicle speed, engine state of ON or OFF, engine torque and motor torque for one or both the torque machines (304) to determine whether the powertrain system is presently operating in either the positive half-plane operating region or the negative half-plane operating region (306), previously described herein with reference to FIG. 2.

When operating in the positive half-plane operating region (308), the process 300 evaluates whether to transition to the negative half-plane operating region, including evaluating whether engine torque constraints, e.g., minimum and maximum engine torques associated with operation in the negative half-plane operating region overlap with an engine torque (Te) capacity range (309). If so, the process 300 commands operation to pre-load engine torque by building an engine torque reserve (310) when the engine torque constraints in the negative half-plane operating region overlap with the engine torque capacity range and the optimization area of the software has indicated that it would be better (e.g. more efficient)

to operate in the negative half-plane operating region. In other words the optimization scheme has chosen an optimum motor B torque (Tb Opt) that is less than −15 Nm. In this operation, there is a desire to transition to the negative half-plane operating region because the optimization scheme indicates that there is less total system power loss. However, before executing a transition to the negative half-plane operating region, that system verifies that there is a valid operating point in the negative half-plane operating region that does not violate another limit, e.g., the output torque request or battery power limits.

Pre-loading the engine torque includes building an engine torque reserve, including determining a target engine torque in the negative half-plane operating region, determining minimum and maximum engine torque limits in the positive half-plane operating region, and engine response type, and determining an engine response type, including either an auto-actuator or a pleasability-limited response type. Building an engine torque reserve includes increasing engine air torque based upon a target engine torque in the negative half-plane operating region while maintaining actual engine torque at a steady state value by retarding engine spark timing or advancing engine fuel injection timing.

System readiness is evaluated, including determining motor B torque (Tb) when the engine is operating at a preferred engine air torque and operating at a preferred time-rate change in the input speed (Ni-dot desired) to traverse the objectionable driveline growl region over a period of time that is sufficiently brief so as not to induce driveline growl that is noticeable or objectionable to the vehicle operator, and an output torque range. Driveline growl that is noticeable to the vehicle operator may be objectively or subjectively quantified during vehicle development and calibration exercises to arrive at limits on traversal times through the objectionable driveline growl region which form the basis for establishing the periods of time that are considered sufficiently brief.

The ready conditions are not met when the determined motor B torque (Tb) is not less than or equal to a motor B torque that falls within the negative half-plane operating region or when a time period elapses prior to the engine achieving the preferred engine air torque (311), and the system aborts execution of the transition to the negative half-plane operating region. In contrast, the ready conditions are met when the determined motor B torque (Tb) is less than or equal to a motor B torque that falls within the negative half-plane operating region and the engine achieves the preferred engine air torque within the time period (313), which leads the process 300 to execute a fast engine torque transition (314).

Executing the fast engine torque transition includes advancing spark retard towards MBT-spark timing while controlling the motor B torque (Tb), which includes calculating a preferred motor B torque (Tb) at an immediate engine torque request accounting for present operating conditions related to the immediate engine torque request, a preferred time-rate change in the input speed and an output torque range with the preferred motor B torque (Tb) constrained within a calibrated rate of change, and with the change in the engine torque constrained at a calibrated ramp rate during the transition through the objectionable driveline growl region to the negative half-plane operating region (315). Executing the fast engine torque transition across the No Fly Zone to the negative half-plane operating region can be aborted when the preferred motor B torque is no longer less than a minimum motor B torque associated with the negative half-plane operating region (317). When the engine achieves MBT-spark timing and while controlling the motor B torque (Tb), operation continues with the motor B torque (Tb) in the negative half-plane operating region (318).

When operating in the negative half-plane operating region (318), the process 300 evaluates whether to transition to the positive half-plane operating region, including evaluating whether engine torque constraints, e.g., minimum and maximum engine torques associated with operation in the positive half-plane operating region overlap with an engine torque (Te) capacity range and evaluating whether an optimized motor B torque Tb is greater than +15 Nm (319).

An abort condition is executed (321) when the optimization scheme decides to operate in the negative half-plane operating region prior to initiating a transition to the positive half-plane operating region and continues operating in the negative half-plane operating region. If there is a decision to transition to the positive half-plane, the process 300 commands operation to execute a fast engine torque transition by retarding spark ignition away from MBT-spark timing or by advancing engine fuel injection timing while controlling the motor B torque (324). The fast engine torque transition operates in response to a change in the immediate engine torque request associated with operating in the positive half-plane operating region. This includes determining engine torque constraints for transitioning to the positive half-plane operating region and constraining motor B torque (Tb) at a calibrated rate of change when the engine is operating at a preferred time-rate change in the input speed (Ni-dot desired) to traverse the objectionable driveline growl region over a period of time that is sufficiently brief so as not to induce driveline growl that is noticeable or objectionable to the vehicle operator taking into account the output torque. Again, driveline growl that is noticeable to the vehicle operator may be objectively or subjectively quantified during vehicle development and calibration exercises to arrive at limits on traversal times through the objectionable driveline growl region which form the basis for establishing the periods of time that are considered sufficiently brief.

Coincident with executing the fast engine torque transition to the positive half-plane operating region, the engine air control closes the throttle and the engine control operates to reduce the spark retard towards MBT-spark timing so that the time-rate change in the engine torque is responsive to commanded changes in the motor B torque (Tb), which includes calculating a preferred motor B torque (Tb) at an immediate engine torque accounting for present operating conditions related to the immediate engine torque, a preferred time-rate change in the input speed and an output torque range with the preferred motor B torque (Tb) constrained within a calibrated rate of change, and with the change in the engine torque constrained at a calibrated ramp rate during the transition through the objectionable driveline growl region to the positive half-plane operating region (325). Executing the fast engine torque transition across the No Fly Zone to the positive half-plane operating region can be aborted when the preferred motor B torque is less than a minimum motor B torque associated with the positive half-plane operating region (327). When the engine achieves MBT-spark timing and while controlling the motor B torque (Tb), operation continues with the motor B torque (Tb) in the positive half-plane operating region (308).

Figure 4:
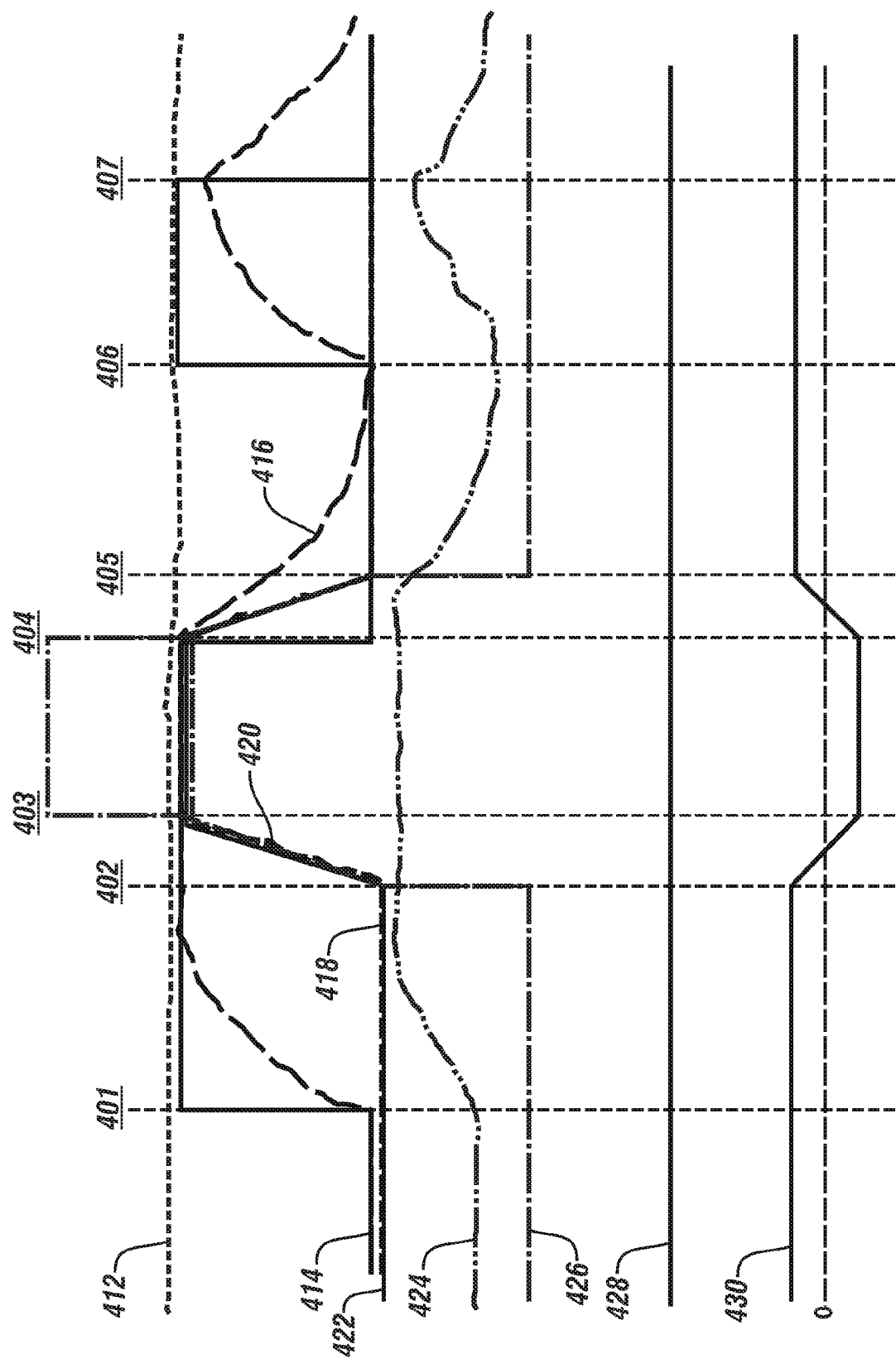
FIG. 4 illustrates data including a plurality of time-coincident engine and powertrain parameters associated with execution of the growl avoidance process during a period of time when the engine is in the ON state and is fueled and firing throughout execution of the process, in accordance with the disclosure.

FIG. 4 graphically shows data including a plurality of time-coincident engine and powertrain parameters associated with execution of the growl avoidance process 300 to traverse the objectionable driveline growl region during a period of time when the engine is in the ON state and is fueled and firing throughout execution of the process. The engine and powertrain parameters include the following: a maximum engine torque 412; a long-term engine torque request 414, which can be a target engine torque request; an engine air torque 416, which is a maximum achievable engine torque at a present intake air flowrate while operating the engine at an MBT-spark setting; an immediate engine torque request 418, which is a presently commanded engine torque; an actual engine torque 420; a maximum engine torque transferable to the transmission 422 and a minimum engine torque transferable to the transmission 426, which are based upon the torque management capabilities of the clutches and electric motors of the transmission, and the power capability of the battery; and an immediate minimum engine torque command 424, which represents a minimum value for the immediate engine torque request 418. An output torque request 428 and motor B torque command 430 are also shown.

Prior to time 401, the powertrain system is operating with the engine in the ON state, fueled and firing, and with the motor B torque command 430 in a positive half-plane operating region of a no-fly zone, e.g., region 224 shown with reference to FIG. 2. At time 401, the long-term engine torque request 414 transitions from a low value to a high value at or near the maximum engine torque 412 in response to a decision to traverse the objectionable driveline growl region from the positive half-plane operating region to the negative half-plane operating region. The engine air torque 416 increases in response, with a response lag due to time delay associated with throttle opening time and intake manifold volume fill time. The immediate engine torque request 418 and thus the actual engine torque 420 are maintained at their previous low states, preferably by retarding engine spark timing relative to MBT-spark timing when the engine is a spark-ignition engine, or by advancing engine fuel injection timing relative to MBT-injection timing when the engine is a compression-ignition engine. At time 402, the engine air torque 416 achieves the long-term engine torque request 414, at which time the transmission is able to traverse the objectionable driveline growl region over a period of time that is sufficiently brief so as not to induce driveline growl that is noticeable to the vehicle operator. The maximum engine torque transferable to the transmission 422 and the minimum engine torque transferable to the transmission 426 are adjusted to accommodate a change in the immediate engine torque request 418 and thus the actual engine torque 420 increases in response to the immediate engine torque request 418, with a corresponding change in the motor B torque command 430 from a positive torque output to a negative torque output. During the period between times 402 and 403, the immediate engine torque request 418 and thus the actual engine torque 420 are adjusted to achieve the long-term engine torque request 414 by adjusting engine spark timing to the MBT-spark timing or another suitable engine control parameter, while the motor B torque command 430 correspondingly changes to cause the transmission to rapidly traverse the objectionable driveline growl region from the positive half-plane operating region to the negative half-plane operating region, thus maintaining the output torque responsive to the output torque request 428. Subsequent to time 403, the powertrain system operates in the negative half-plane operating region in response to the output torque request 428.

At time 404, the long-term engine torque request 414 transitions from a high value to a low value in response to a decision to traverse the objectionable driveline growl region from the negative half-plane operating region to the positive half-plane operating region. Reductions in the immediate engine torque request 418 and thus the actual engine torque 420 are commanded in response, preferably by retarding engine spark timing when the engine is a spark-ignition engine. The actual engine torque 420 and the motor B torque command 430 are immediately controllable such that operation of the transmission traverses the objectionable driveline growl region over the sufficiently brief period of time that is coincident with the reduction in the actual engine torque 420. The maximum engine torque transferable to the transmission 422 and the minimum engine torque transferable to the transmission 426 are adjusted to accommodate a change in the immediate engine torque request 418 and thus the change in the actual engine torque 420, with a corresponding change in the motor B torque command 430 from the negative half-plane operating region to the positive half-plane operating region. The engine air torque 416 decreases in response, with a response lag due to time delay associated with throttle closing time and intake manifold volume fill time. At time 405, the immediate engine torque request 418 and thus the actual engine torque 420 achieve the long-term engine torque request 414. The motor B torque command 430 remains in the positive half-plane operating region. At time 406, the engine air torque 416 achieves the long-term engine torque request 414. At this time, the long-term engine torque request 414 can again be controlled such that operation of the powertrain can include a decision to execute controls to traverse the objectionable driveline growl region from the positive half-plane operating region to the negative half-plane operating region. The engine air torque 416 increases in response to the transition from low value to high value at or near the maximum engine torque 412, with a response lag due to the time delay associated with throttle opening time and intake manifold volume fill time. The immediate engine torque request 418 and thus the actual engine torque 420 are held at their previous low states, preferably by retarding engine spark timing relative to MBT-spark timing. At time 407, which can be a predetermined period of time subsequent to the actions undertaken at time 406, the engine air torque 416 fails to achieve the long-term engine torque request 414, and the growl avoidance process 300 aborts the transition, thus reducing the long-term engine torque request 414 with a corresponding reduction in the engine air torque 416 coordinated with advancement of the previously retarded spark timing to the MBT-spark timing. Thus, the engine torque transition from time 404 to time 405 was executed sufficiently fast to prevent any detection of driveline growl. In one embodiment, the motor B torque Tb needs to reside in the growl zone, e.g., −10<Tb<10 Nm, for a sufficiently long period of time, e.g., ~50 to 100 msec, in order for growl to take place. Thus the transition across the no-fly zone transition occurs quickly enough to prevent growl from occurring or being detected.

Figure 5:
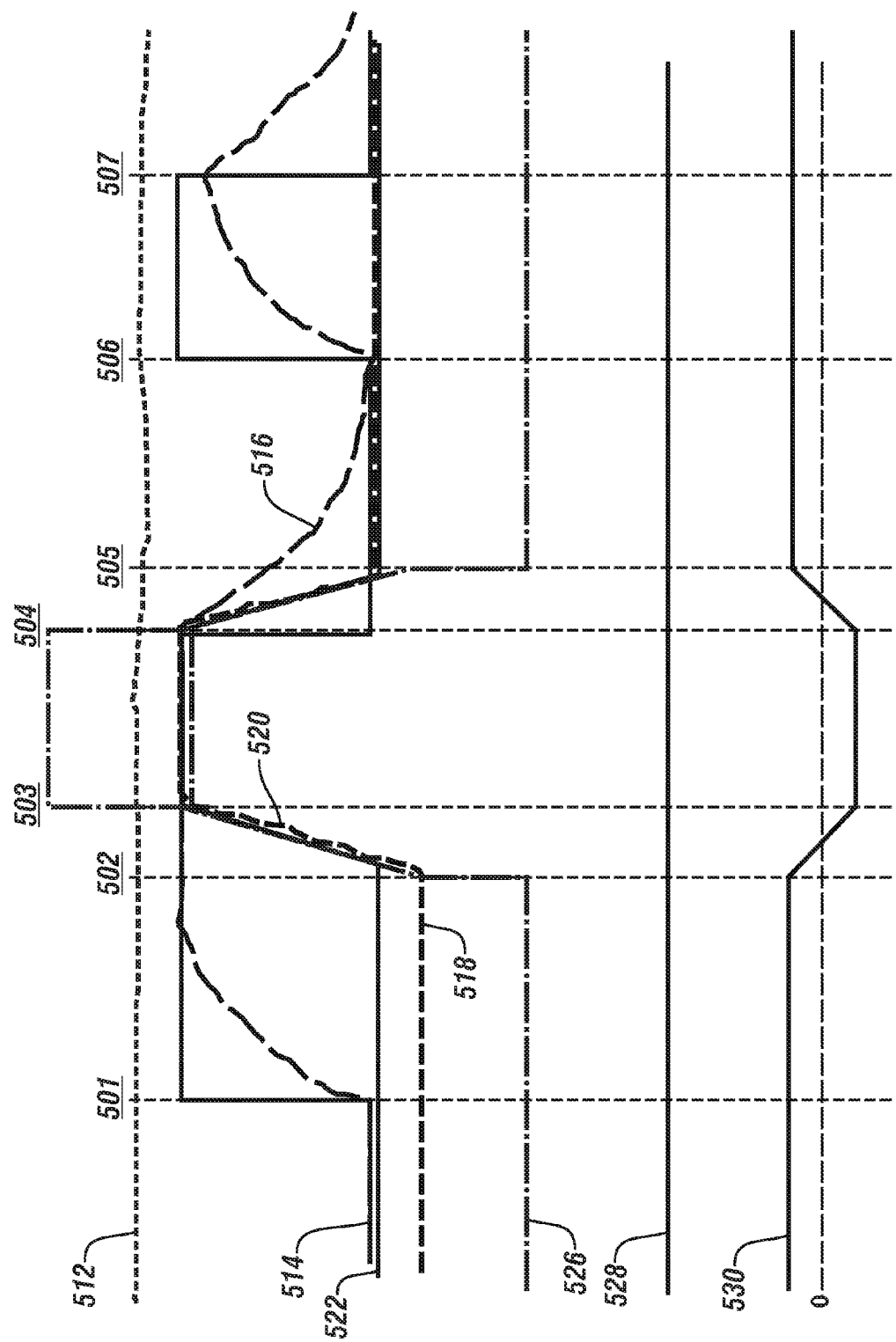
FIG. 5 illustrates data including a plurality of time-coincident engine and powertrain parameters associated with execution of the growl avoidance process during a period of time when the engine transitions between operating in an FCO state and operating in a fueled and firing state during execution of the process, in accordance with the disclosure.

FIG. 5 graphically shows data including a plurality of time-coincident engine and powertrain parameters associated with execution of the growl avoidance process 300 to traverse the objectionable driveline growl region during a period of time when the engine transitions between operating in an FCO state and operating in a fueled and firing state as part of executing the growl avoidance process 300. The engine and powertrain parameters include the following: a maximum engine torque 512; a long-term engine torque request 514, which can be a target engine torque request; an engine air torque 516, which is a maximum achievable engine torque at a present intake air flowrate; an immediate engine torque request 518, which is a presently commanded engine torque; an actual engine torque 520; a maximum engine torque transferable to the transmission 522 and a minimum engine torque transferable to the transmission 526, which are based upon the torque management capabilities of the clutches and electric motors of the transmission; and an immediate minimum engine torque command 524, which represents a minimum value for the immediate engine torque request 518, which is a presently commanded minimum engine torque. An output torque request 528 and motor B torque command 530 are also shown.

Prior to time 501, the powertrain system is operating with the engine in the ON state, but unfueled and not firing, i.e., in an FCO state, and the powertrain system is operating with the motor B torque command 530 in a positive half-plane operating region of a no-fly zone, e.g., region 224 shown with reference to FIG. 2. At time 501, the long-term engine torque request 514 transitions from a low value to a high value at or near the maximum engine torque 512 in response to a decision to traverse the objectionable driveline growl region from a positive half-plane operating region to a negative half-plane operating region. The engine air torque 516 increases in response, with a response lag due to time delay associated with throttle opening time and intake manifold volume fill time. The immediate engine torque request 518 and thus the actual engine torque 520 are held at their previous low states, preferably by retarding engine spark timing. At time 502, the engine air torque 516 achieves the long-term engine torque request 514, at which time the engine and powertrain are controllable to permit the transmission to traverse the objectionable driveline growl region over the sufficiently brief period of time. The minimum engine torque transferable to the transmission 526 and the maximum engine torque transferable to the transmission 522 are adjusted to accommodate a change in the immediate engine torque request 518 and thus the engine is fueled and firing, causing the actual engine torque 520 to increase in response to the long-term engine torque request 514, with a corresponding change in the motor B torque command 530 from a positive torque output to a negative torque output. During the period between times 502 and 503, the immediate engine torque request 518 and thus the actual engine torque 520 are adjusted to achieve the long-term engine torque request 514 by fueling and firing the engine, while the motor B torque command 530 correspondingly reduces to permit the transmission to rapidly traverse the objectionable driveline growl region from the positive half-plane operating region to the negative half-plane operating region, thus maintaining transmission output torque responsive to the output torque request 528. Subsequent to time 503, the powertrain system operates in the negative half-plane operating region in response to the output torque request 528 with the engine generating torque.

At time 504, the long-term engine torque request 514 transitions from a high value to a low value in response to a decision to control the transmission to traverse the objectionable driveline growl region from the negative half-plane operating region to the positive half-plane operating region. The immediate engine torque request 518 and thus the actual engine torque 520 are commanded in response, preferably by operating the engine in the FCO state unfueled and unfired. The actual engine torque 520 and the motor B torque command 530 are immediately controllable such that operation of the transmission traverses the objectionable driveline growl region over the sufficiently brief period of time coincident with the reduction in the actual engine torque 520. The minimum engine torque transferable to the transmission 522 and the maximum engine torque transferable to the transmission 526 are adjusted to accommodate a change in the immediate engine torque request 518 and thus the change in the actual engine torque 520, with a corresponding change in the motor B torque command 530 from the negative half-plane operating region to the positive half-plane operating region. The engine air torque 516 decreases in response, with a response lag due to time delay associated with throttle closing time and intake manifold volume fill time. At time 505, the immediate engine torque request 518 and thus the actual engine torque 520 achieves the long-term engine torque request 514, which is associated with operating the engine in the FCO state. The motor B torque command 530 remains in the positive half-plane operating region. At time 506, the engine air torque 516 achieves the long-term engine torque request 514. At this time, the long-term engine torque request 514 can again decide to traverse the objectionable driveline growl region from the positive half-plane operating region to the negative half-plane operating region. The engine air torque 516 increases in response to the transition from low value to high value at or near the maximum engine torque 512, with a response lag due to the time delay associated with throttle opening time and intake manifold volume fill time. The immediate engine torque request 518 and thus the actual engine torque 520 are held at their previous low states, preferably by remaining in the FCO state unfueled and unfired. At time 507, which can be a predetermined period of time subsequent to the actions undertaken at time 506, the engine air torque 516 fails to achieve the long-term engine torque request 514, and the growl avoidance process 300 aborts the transition, thus reducing the long-term engine torque request 514 with a corresponding reduction in the engine air torque 516.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system including an engine coupled to a multi-mode transmission configured to transfer tractive torque to an output member coupled to a ground wheel, comprising:
   identifying an undesirable operating region for the multi-mode transmission conducive to driveline growl, the undesirable operating region defined by an input torque range and an output torque range; and
   in response to a command to traverse the undesirable operating region from a first operating region to a second operating region, executing a fast engine torque transition including controlling the engine as a fast-adjusting torque actuator to control input torque from the engine to the multi-mode transmission and correspondingly controlling motor torque from a torque machine to the multi-mode transmission to maintain output torque from the multi-mode transmission responsive to an output torque request while traversing the undesirable operating region from the first operating region to the second operating region rapidly to minimize operating time in the undesirable operating region.

2. The method of claim 1, further comprising pre-loading engine torque prior to executing the fast engine torque transition including controlling the engine as the fast-adjusting torque actuator to control the input torque to the multi-mode transmission.

3. The method of claim 2, wherein pre-loading the engine torque prior to executing the fast engine torque transition comprises increasing engine torque capability by increasing an engine air torque and maintaining the input torque to the multi-mode transmission at an unchanged magnitude by retarding engine spark timing.

4. The method of claim 1, wherein controlling the engine as the fast-adjusting torque actuator to control the input torque to the multi-mode transmission and correspondingly controlling the motor torque from the torque machine to the multi-mode transmission to maintain output torque from the multi-mode transmission responsive to the output torque request comprises increasing the input torque and correspondingly decreasing the motor torque.

5. The method of claim 1, wherein controlling the engine as the fast-adjusting torque actuator to control the input torque to the multi-mode transmission and correspondingly controlling the motor torque from the torque machine to the multi-mode transmission to maintain the output torque from the multi-mode transmission responsive to the output torque request comprises decreasing the input torque and correspondingly increasing the motor torque.

6. The method of claim 1, wherein controlling the engine and correspondingly controlling the torque machine to maintain output torque from the multi-mode transmission responsive to the output torque request while traversing the undesirable operating region from the first operating region to the second operating region rapidly to minimize operating time in the undesirable operating region comprises controlling the engine and correspondingly controlling the torque machine to traverse the undesirable operating region over a sufficiently brief period of time so as the motor torque does not fall in the undesirable operating range for enough time for driveline growl to take place.

7. The method of claim 1, further comprising aborting the command to traverse the undesirable operating region when a commanded engine air torque fails to achieve a long-term engine torque request within a predetermined period of time.

8. A computerized process for controlling a powertrain system configured to transfer tractive torque to an output member coupled to a ground wheel of a vehicle, the process comprising:
within a computerized processor, identifying an undesirable operating region for a multi-mode transmission, the undesirable operating region conducive to driveline growl and defined by an input torque range and an output torque range;
in response to a command to traverse the undesirable operating region, controlling input torque from an engine configured to transfer torque to an input member of the multi-mode transmission as a fast-adjusting torque actuator and correspondingly controlling torque from a torque machine to the multi-mode transmission to maintain output torque from the multi-mode transmission; and
transitioning operation of the multi-mode transmission across the undesirable operating region from a first operating region to a second operating region rapidly to minimize the operating time of the multi-mode transmission in the undesirable operating region.

9. The method of claim 8, further comprising pre-loading engine torque prior to executing the fast engine torque transition including controlling the engine as a fast-adjusting torque actuator to control the input torque to the multi-mode transmission.

10. The method of claim 9, wherein pre-loading engine torque prior to executing the fast engine torque transition comprises increasing engine torque capability by increasing an engine air torque and maintaining the input torque to the multi-mode transmission at an unchanged magnitude by retarding engine spark timing.

11. The method of claim 8, wherein controlling the engine as the fast-adjusting torque actuator to control the input torque to the multi-mode transmission and correspondingly controlling the motor torque from the torque machine to the multi-mode transmission to maintain output torque from the multi-mode transmission responsive to an output torque request comprises increasing the input torque and correspondingly decreasing the motor torque.

12. The method of claim 8, wherein controlling the engine as the fast-adjusting torque actuator to control the input torque to the multi-mode transmission and correspondingly controlling the motor torque from the torque machine to the multi-mode transmission to maintain output torque from the multi-mode transmission responsive to an output torque request comprises decreasing the input torque and correspondingly increasing the motor torque.

13. The method of claim 8, wherein controlling the engine and correspondingly controlling the torque machine to maintain output torque from the multi-mode transmission responsive to an output torque request while traversing the undesirable operating region from the first operating region to the second operating region rapidly to minimize the operating time of the multi-mode transmission in the undesirable operating region comprises controlling the engine and correspondingly controlling the torque machine to traverse the undesirable operating region over a sufficiently brief period of time so as the motor torque does not fall in the undesirable operating range for enough time for driveline growl to take place.

14. The method of claim 8, further comprising aborting the command to traverse the undesirable operating region when a commanded engine air torque fails to achieve a long-term engine torque request within a predetermined period of time.

15. The method of claim 8, wherein identifying an undesirable operating region for the multi-mode transmission including the input torque range and the output torque range comprises identifying the operating region associated with objectionable driveline growl in an off-line environment.

* * * * *